No. 729,467. PATENTED MAY 26, 1903.
J. C. WHITE.
EXPLOSION ENGINE.
APPLICATION FILED MAR. 26, 1902.
NO MODEL.
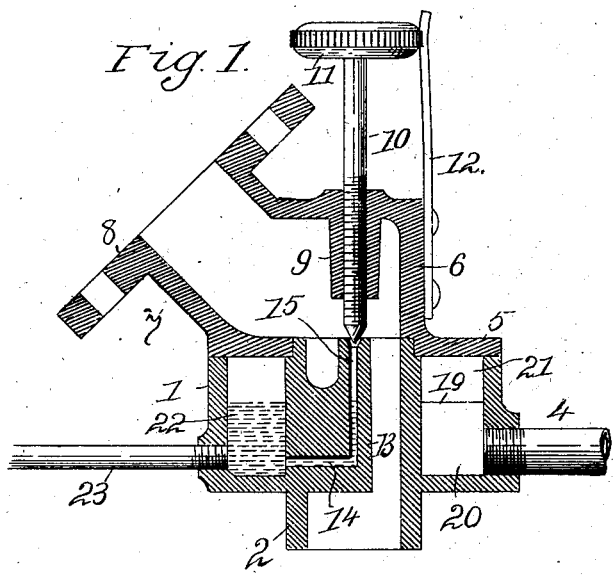
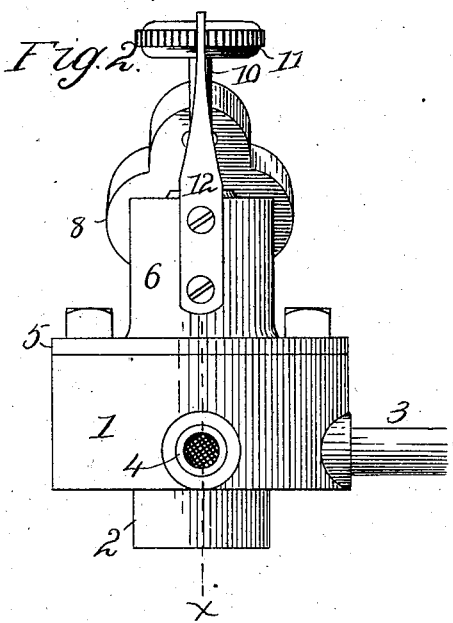
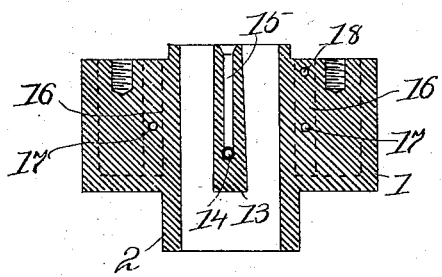
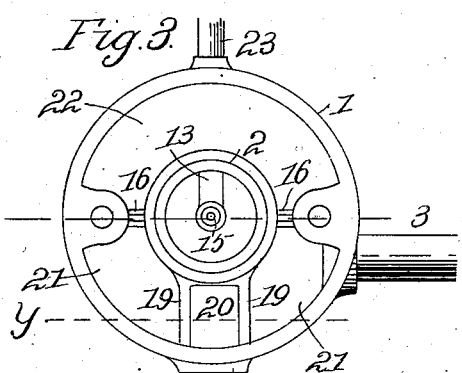
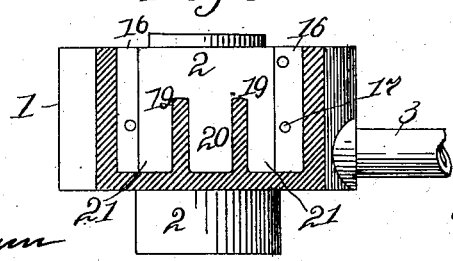
Witnesses.
Nora Graham
Ina Graham
Inventor,
John C. White.
by L. R. Graham
his attorney.

No. 729,467. Patented May 26, 1903.

UNITED STATES PATENT OFFICE.

JOHN C. WHITE, OF DECATUR, ILLINOIS, ASSIGNOR TO WILLIAM L. OAKES, OF DECATUR, ILLINOIS.

EXPLOSION-ENGINE.

SPECIFICATION forming part of Letters Patent No. 729,467, dated May 26, 1903.

Application filed March 26, 1902. Serial No. 100,134. (No model.)

*To all whom it may concern:*

Be it known that I, JOHN C. WHITE, of the city of Decatur, in the county of Macon and State of Illinois, have invented certain new and useful Improvements in Explosion-Engines, of which the following is a specification.

The object of this invention is to insure uniformity in the quantity of liquid fuel supplied to the cylinder of an explosion-engine at each inspiration of the engine.

The invention is exemplified in the structure hereinafter described, and it is defined in the appended claims.

In the drawings forming part of this specification, Figure 2 is an elevation of a fuel-receptacle constructed in accordance with my invention. Fig. 1 is a section on line X in Fig. 2. Fig. 3 is a plan of the fuel-retaining basin. Fig. 4 is a section on line X in Fig. 3.
Fig. 5 is a section on Y in Fig. 3.

The fuel-basin is annular. Its outer wall is shown at 1. Its inner wall is shown at 2, and the inner wall incloses a passage through which air passes to the engine. The fuel-basin is divided into two principal compartments by partitions 16, such compartments being designated by numerals 21 and 22, respectively. An inlet-pipe 3 communicates with compartment 21 of the fuel-basin. A return-pipe 4 communicates indirectly with the same compartment, and a fuel reservoir and pump (not shown) coöperate with the pipes in practical operation to complete a circuit and maintain a continuous flow of fuel to the compartment 21. Partitions 19 rise from the bottom of compartment 21 to a distance less than the height of the basin, and they inclose an overflow-receptacle, with which pipe 4 communicates. The partitions 16 are provided with holes 17 for the passage of the fuel, and such holes are located below the level of the upper edges of walls 19. The holes 17 afford passages for fuel from compartment 21 to compartment 22 and their size is determined by the demands of the engine—that is to say, they are large enough to supply a sufficient quantity of fuel, but not needlessly large. An extension 13 projects from compartment 22 into the air-space inclosed by wall 2. A horizontal passage-way 14 extends from the bottom of compartment 22 out into extension 13, and a vertical passage-way 15 connects with passage-way 14 and communicates at its upper end with the air-passage. The extension 13 rises above the overflow-walls 19 and is therefore above the level of the fuel in the basin.

A cap 5 covers the annular fuel-basin, and its walls 6 and 7 form a continuation of the air-passage. A plate 8 provides means for securing the cap to an engine. The cap has an internally-threaded bearing 9 in alinement with the vertical part 15 of the fuel-passage, and a threaded stem 10 is screwed into bearing 9. The lower end of stem 10 is shaped to close the outer passage, and, as a matter of preference, the outlet of the passage-way and the end of the stem are made correspondingly conical. The upper end of the stem is provided with a milled or notched wheel 11, and a spring-detent 12 is secured to wall 6 of the cap, with its upper end in position to engage the notches of the wheel. A drain-pipe 23 communicates with the fuel-compartment 22. It is commonly closed, and it provides means for drawing off the contents of the compartment whenever such operation is necessary.

The horizontal part 14 of the fuel-passage is somewhat larger than the vertical part 15, and when the feeder is in operation the upper discharge end of the passage-way is contracted by stem 10 until the outlet is smaller than the passage. The size of the outlet is determined partly by experiment, and the wheel 11 is turned back and forth while the engine is operating until the desired quantity of fuel is supplied to the engine. The detent 12 will hold the wheel in the desired position when such position is once determined, and after that the operation of the wheel and the stem consists in entirely closing the fuel-outlet to stop the engine and opening it to the predetermined point preliminary to starting. The level of the fuel is below the outlet of passage 15, as shown in Fig. 1, and at each inspiration of the engine the fuel is drawn up the passage-way, the quantity required for a charge is permitted to escape through the contracted outlet, and all not escaping at once settles back to the level of the fuel in compartment 22. To insure uniformity of feed, it is necessary that the fuel in passage-way 15 should stand always at the same level immediately preceding an inspiration of the engine, and it is also essential that the level of the fuel shall be sufficiently low to preclude slopping or undesirable and uncontrollable passage of the fuel into the air-space. For these reasons the level of the fuel is safely below the outlet, the controlling-valve is placed in the outlet or above the outlet, and the passage-way for the fuel is unobstructed and formed to facilitate rapid descent of the fuel. The diminished part of the passage is at the outlet end thereof. Nothing but air flows through such diminished part as the fuel settles, and the more perfect fluidity of the air enables the fuel to settle without restraint. As the fuel is supplied to compartment 21 of the fuel-basin by a pumping operation there is an intermittency in the motion of the fuel that tends to disturb uniformity of the level of the fuel in the basin; but this fluctuation does not extend to compartment 22 for the reason that the holes constituting the oil-passages are so small that a fluctuation in the compartment 21 cannot be transmitted to compartment 22 to any appreciable extent.

It has been found practical to entirely separate compartment 22 from compartment 21 above the fuel-level; but air-passages, as 18 in Fig. 4, may be formed in the partitions, if desired.

I claim—

1. In a fuel-feeder for explosion-engines, an air-conduit, a fuel-chamber, a passage-way for the fuel projecting from the fuel-chamber into the air-conduit and extending upward above the level of the fuel in the chamber, such passage-way being contracted at its outlet and unobstructed otherwise, substantially as described.

2. In a fuel-feeder for explosion-engines, an air-conduit, a fuel-chamber, a passage-way for the fuel projecting from the fuel-chamber into the air-conduit and extending upward above the level of the fuel in the chamber and a valve to contract the outlet of the passage-way, substantially as described.

3. In a fuel-feeder for explosion-engines, an air-conduit, a fuel-chamber, partitions dividing the fuel-chamber into two principal compartments, such partitions having small openings below the fuel-level, a supply-pipe and a return-pipe communicating with one of the compartments of the fuel-chamber and a passage-way leading from the other chamber into the air-conduit, substantially as described.

4. In a fuel-chamber for explosion-engines, the combination of an air-conduit, a fuel-chamber encircling the air-conduit, partitions dividing the fuel-chamber into two principal compartments, such partitions having small openings below the fuel-level, an inlet-pipe and a return-pipe communicating with one of the compartments of the fuel-chamber and a passage-way leading from the other compartment into the air-conduit and terminating upward above the fuel-level, the passage-way being contracted at its outlet and otherwise unobstructed, substantially as described.

In testimony whereof I sign my name in the presence of two subscribing witnesses.

JOHN C. WHITE.

Witnesses:
 WM. L. OAKES,
 GEO. R. OAKES.